United States Patent Office 3,732,308
Patented May 8, 1973

3,732,308
1-ALKYLAMINO - 3 - (1,4-ETHANO-1,2,3,4-TETRA-HYDRO - 5 - NAPHTHOXY)-AND - 3-(5-BENZO-NORBORNANOXY) - 2-PROPANOLS AND THE SALTS THEREOF
Francesco Lauria, Milan, Vittorio Vecchietti, Pavia, Mario Bergamaschi, Monza, Milan, and Raffaele Tommasini, Milan, Italy, assignors to Carlo Erba S.p.A., Milan, Italy
No Drawing. Filed July 24, 1970, Ser. No. 58,165
Claims priority, application Italy, July 30, 1969, 20,278/69
Int. Cl. C07c 93/06
U.S. Cl. 260—570.7         8 Claims

ABSTRACT OF THE DISCLOSURE

Basic compounds are disclosed, as for instance of the formula:

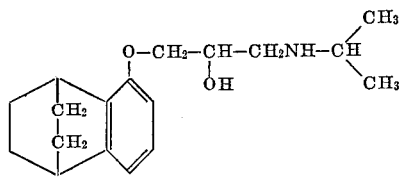

and methods of preparation of these compounds, such as the reaction of isopropylamine with 1-(1,4-ethano-1,2,3,4-tetrahydro-5-naphthoxy) - propyl-2,3-epoxide. The compounds possess adrenergic beta-receptor blocking activity.

DESCRIPTION OF THE INVENTION

This invention relates to certain compounds having cardiovascular activity and to a process for their preparation.

According to the present invention, pharmaceutically active compounds are disclosed, having cardiovascular activity, of the general formula:

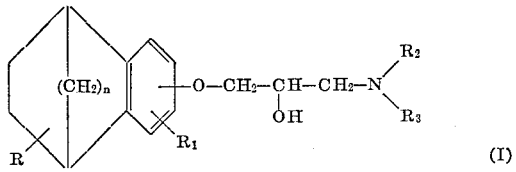 (I)

where R and $R_1$ are independently:
(a) hydrogen,
(b) halogen,
(c) lower alkyl of 1 to 4 carbon atoms,
(d) lower alkoxy of 1 to 4 carbon atoms,
(e) nitro,
(f) an amino group of the general formula:

where R' and R" are independently selected from the group consisting of hydrogen and lower alkyl of 1 to 4 carbon atoms;
(g) —NH—CO$(CH_2)_{n_1}$—$CH_3$ where $n_1$ is 0 to 6,
(h) —N(CH$_3$)—CO$(CH_2)_{n_1}$CH$_2$ where $n_1$ is defined as above
(i) —NH—SO$_2$—R''' wherein R''' is an alkyl group of 1 to 6 carbons,
(j) —S—R''', where R''' is defined as above,
(k) —SO—R''', where R''' is defined as above,

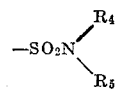

where $R_4$ and $R_5$ are independently hydrogen or R''' as identified above,
$n$ is 1 or 2, $R_2$ is hydrogen, lower alkyl of 1 to 4 carbons or a benzyl group, $R_3$ is hydrogen, alkyl of 1 to 10 carbons or a benzyl group.

The compound of Formula I is useful either as the free base form and in the addition salt form, both forms being within the purview of the invention.

Appropriate pharmaceutically-acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, ascorbic acid, methane-sulfonic acid, ethanesulfonic acid, quinic acid, 3-hydroxy-2-naphthoic acid, naponic acid (1,5-naphthalene-disulfonic acid), acetylsalicylic acid, salicylic acid, mucic acid, muconic acid and the like, giving the hydrochloride, hydrobromide, hydriodide, nitrate, phosphate, sulfamate, sulfate, acetate, citrate, tartrate, lactate, ascorbate, methanesulfonate, ethanesulfonate, quinate, 3-hydroxy-2-naphthoate, naponate, acetylsalicylate, salicylate, mucate, and muconate, respectively.

The acid addition salts are prepared preferably by reacting the free base and acid in an organic solvent, e.g., ethanol, acetone, dimethylformamide, etc., in which case the salt separates directly or can be obtained by concentration of the solution as is hereinafter described.

Although pharmaceutically-acceptable salts are preferred, all acid addition salts are within the scope of our invention. All acid addition salts are useful as sources of the free base form even if the particular salt per se is not desired as the final product, as for example when the salt is formed for purposes of purification or identification, or when it is used as an intermediate in preparing a pharmaceutically-acceptable salt.

The terms "lower alkyl" and "lower alkoxy" as used herein refer to those groups having from 1 to 4 carbon atoms; these groups, of course, can be either branched or straight chain. For instance, such groups include methyl, ethyl, propyl, isopropyl, butyl, n-butyl, methoxy and ethoxy.

The following reactions describe several methods of preparing the compounds of the invention as disclosed above. While reactions are conveniently conducted at atmospheric pressure, higher and lower pressures may also be used if desired. The reactions may be conducted with or without a solvent. However, when a solvent is used it should be inert to the particular reactants and may be, for instance, toluene or dioxane.

The compounds of Formula I are readily prepared by the following methods:

(a) Reacting a compound of the general formula:

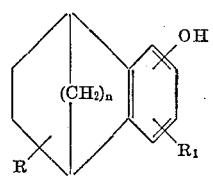 (II)

as prepared according to the method of R. W. Alder and M. C. Whiting, J. Chem. Soc., 1963, 4598, the disclosure of which is hereby incorporated by reference, where R and $R_1$ are as defined above, with a compound of the formula

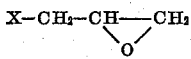

where X is a halogen, preferably chlorine, at a temperature of 40° to 150° C. to form a compound of the general formula:

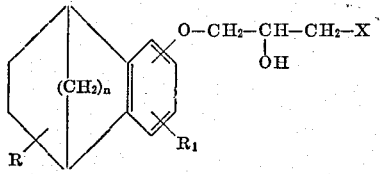
(III)

The compounds of Formula III are subsequently reacted with amines of the general formula:

where $R_2$ and $R_3$ are as defined above, at a temperature of 20° to 150° C., thereby producing the product of Formula I.

(b) Transforming alopropanols of Formula III above into epoxides of the following general formula:

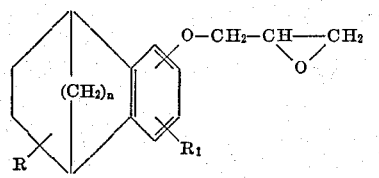
(IV)

by treatment at 20° to 80° C. with a base such as, for example, NaOH, NaOCH₃ and the like, then reacting the epoxides of Formula IV with amines of the general formula:

as described above, at a temperature of 20° to 150° C., thereby producing the product of Formula I.

(c) Reacting the phenols of Formula II with compounds of the general formula:

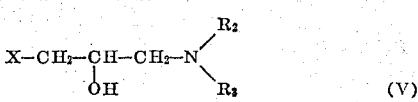
(V)

where X, $R_2$ and $R_3$ are as described above, at a temperature of 20° to 150° C. to form a compound of Formula I.

(d) Reacting a compound of the general Formula VI:

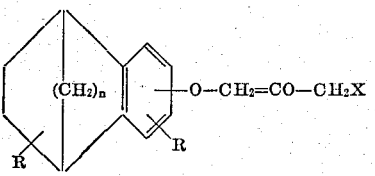
(VI)

wherein R, $R_1$ and X are as defined above (obtained by reaction of an alkaline salt of a compound of Formula II above with a compound of the formula

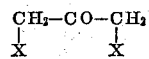

where X is a halogen, preferably chlorine or bromine) with an amine of general formula $HNR_2R_3$, where $R_2$ and $R_3$ are as defined above, and subsequently reducing the keto-group by a suitable reductive agent, such as LiAlH₄.

(e) Catalytically reducing a compound of general Formula I wherein $R_1$ is a nitro group, to give a compound of general Formula I wherein $R_1$ is an amino group, which is then optionally acylated to give a compound of general Formula I wherein $R_1$ is an alkanesulphonamido group or a group of general formula

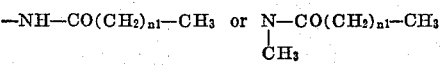

wherein $n_1$ is as defined above. Suitable acylating agents for reaction (e) are the appropriate chloride (according to the Schotten-Baumann Reaction), or the appropriate acid (for example methane- or ethane-sulphonic acid) in the presence of a condensing agent (for example dicyclohexylcarbodiimide), or an acid derivative (for example an anhydride or mixed anhydride). The preferred chlorides and anhydrides are those of an organic acid, for example acetic, isobutyric or pivalic acid. The compounds described in the present invention possess a therapeutic activity on the cardiovascular system which is linked to their ability to block the activity of the adrenergic beta-receptors.

The clinical and pharmacodynamical properties of the adrenergic beta-receptor blocking agents are discussed in Goodman and Gilman (The Pharmacological Basis of Therapeutics (1965), pages 563–565, the disclosure of which is hereby incorporated by reference) and their clinical usefulness is reported in a large number of papers.

The activity of the present compounds was assessed by comparing their ability to block the cardiovascular effects of the sympathomimetic amine isoproterenol (chemically, dl-β-[3,4-dihydroxphenyl] - α - isopropyl-aminoethanol), which selectively stimulates adrenergic beta-receptors (Goodman and Gilman, pages 497–498), to that propranolol (R. G. Shanks, Cardiologia Suppl. II, vol. 49:–16, 1966).

The following studies were made:

(1) Evaluation of the activity in antagonizing the cardiovascular response induced by intravenous injection of isoproterenol, in cats under general anaesthesia. This procedure has been described in Cardiologia Suppl. II, 1966, 49:1–16 (1966).

(2) Action of the compounds of the present invention antagonizing the increase in the heart rate induced by the injection of isoproterenol in non-anaesthetized dogs. This procedure has been described in J. Pharmacol. Exp. Therap. 1965, 149, 161–173.

(3) The anti-arrhythmic activity of the compounds was tested in non-anaesthetized rabbits treated with BaCl₂. This procedure has been described in Acta Physiol. Acad. Sci. Hung. 1967, 32:365–375.

(4) Hypotensive activity in non-anaesthetized dogs with neurogenic hypertension as described by M. Bergamaschi (to be pjublished), was also noted.

A number of compounds were found to be active in antagonizing the respective subject animal's response to isoproterenol. In particular, the following compounds were selected for potency studies in comparison to known compounds:

(Compound I): 1-isopropylamino-3(1,4-ethano-1,2,3,4-tetrahydro-5-naphthoxy)-2-propanol
(Compound II): 1-isopropylamino-3(1,4-ethano-1,2,3,4-tetrahydro-8-nitro-5-naphthoxy)-2-propanol
(Compound III): 1-isopropylamino-3(1,4-ethano-1,2,3,4-tetrahydro-8-acetamide-5-naphthoxy)-2-propanol
(Compound IV): 1 - isopropylamino - 3(1,4--ethano-1,2,3,4-tetrahydro-8-methansulphonamido-5-naphthoxy 2-propanol
(Compound V): 1-isopropylamino-3(5-benzonorbornan-oxy)-2-propanol The above compounds were tested for beta-adrenergic blocking activity by comparison to a known standard of isoproterenol as described in point (2) above for their antagonism of increased heart rate induced by the injection of isoproternol.

In these tests Propranolol was used as the reference compound and was assigned a value of 1 for its beta-aldrenergic receptor blocking activity. The activity of Sotalol was also compared to Propranolol. Table A shows the relative activities of the respective compounds in blocking the tachycardia induced by the administration of isoproterenol.

TABLE A

| Compound: | Non-anaesthetized dog |
|---|---|
| Propranolol | 1 |
| Sotalol | 0.5 |
| I | 4 |
| II | 1 |
| III | 1.2 |
| IV | 0.5 |
| V | 0.8 |

Thus it was concluded that based on the several above studies, all the compounds reduce the basal heart rate in non-anaesthetized and anaesthetized animals. Moreover, it was observed that Compound I (1-isoproylamino-3(1,4-ethan-1,2,3,4-tetrahydro - 5 - naphthoxy) - 2 - propanol) shows greater anti-arrhythmic and hypotensive activity than the reference compound propranolol. The results obtained in cats under anaesthesia in the evaluation Number 1 as described above confirm the ratios between the beta-adrenergic blocking activities for the compounds given in Table A.

From the above studies it can be presumed that all of the compounds disclosed herein have similar activities, to a greater or lesser extent, as those of Compounds I–V. The dosage ranges for warm blooded mammals from about 0.05 to 0.5 mg./kg. and preferably 0.1 to 0.2 mg./kg. are contemplated by the present invention.

The following examples illustrates, but do not limit, the scope of the present invention. Unless otherwise indicated, all parts and percentages are by weight and all pressures are atmospheric.

Example 1

6-hydroxy-benzonorbornane (15.5 g.) is mixed with epichlorhydrin (50 ml.) and 6 drops of piperidine. The mixture is heated to 100° C. for a period of 17 hours. When the reaction is complete, the excess epichlorhydrin is evaporated and the resulting mass stirred for 23 hours at 25° C. with a solution of NaOH (12.9 g. in 100 ml. of water). It is then extracted with diethyl ether and the residue obtained after evaporation of the solvent is vacuum distilled. C.P.$_{0.2}$ of 120–123° C.

A quantity of the epoxide (8 g.), as obtained above, was heated in a closed tube with toluene (15 ml.) and isopropylamine (15 ml.), at 110° C. for 16 hours. After evaporation of the solvent, the residue is taken up in diethyl ether and converted to the hydrochloride salt by gaseous HCl; the resulting 1-isopropylamino-3-(6-benzonorbornanoxy) - 2 - propanol hydrochloride product was found to have a melting point of 93–95° C.

Example 2

5-hydroxy-benzonorbornane (9 g.) is heated at 100° C. for 17 hours with epichlorhydrin (35 ml.) and 4 drops of piperidine. After evaporation of the solvent, the residue is extracted with diethyl ether, washed with water and, after evaporation of the diethyl ether solvent, gives 1-chloro-3-(5 - benzonorbornanoxy)-2-propanol: C.P.$_{0.2}$ of 170–175° C.

9.6 g. of the distilled product as obtained above is dissolved in toluene (20 ml.) and isopropylamine (20 ml.) and heated in a closed tube at 110° C. for 16 hours. After evaporation of the toluene solvent and of the excess isoproylamine, the residue thus obtained is dissolved in diethyl ether and purified. It is then converted into 1-isopropylamine-3-(5 - benzonorbornanoxy)-2-propanol hydrochloride, melting point 80–85° C.

Examples 3–5

Using the same reaction conditions as above the following compounds were prepared by the process described in Example 2 with the indicated starting material substituted for the 5-hydroxy-benzonorbornane; the resultant products are as indicated.

TABLE B

| Example | Starting material | Product |
|---|---|---|
| 3 | 3-methyl-5-hydroxy-benzonorbonane | 1-isoropylamino-3-(3-methyl-5-benzonorbornanoxy)-2-propanol, M.P. 85–87° C. |
| 4 | 3-chloro-5-hydroxy-benzonorbornane | 1-isopropylamino-3-(3-chloro-5-benzonorbonanoxy)-2-propanol, M.P. 100–103° C. |
| 5 | 3-methoxy-5-hydroxy-benzonorbornane | 1-isopropylamino-3-(3-methoxy-5-benzonorbornanoxy)-2-propanol, M.P. 112-115° C. |

Example 6

A solution of 1-(5 - benzonorbornanoxy)-propyl-2,3-epoxide (5 gm.) in tert. butylamine and toluol (100 ml.) are refluxed overnight. After evaporation and distillation of the excess amine, the residue is then dissolved in diethyl ether and reacted with fumaric acid by heating to give 1-tert. butylamino-3-(5-benzonorbornanoxy)-2-propanol fumarate, melting point 150–153° C.

Example 7

Similarly, 1-isobutylamino-3-(5 - benzonorbornanoxy)-2-propanol was prepared by the process described in Example 6 with isobutylamino substituted for the tertiary butylamine.

Example 8

3-(6-benzonorbornanoxy)-1-chloro - 2 - propanol (7 g.) is dissolved in diethylamine (10 ml.) and benzene (10 ml.); the resulting solution is heated at 120° C. for a period of 18 hours. After evaporation of the solvent and amine, the residue thus obtained is extracted with 25 ml. 1 N HCl and the 1-diethylamino-3-(6-benzonorbornanoxy)-2-propanol is obtained by basification with NaOH.

Examples 9–11

Under the same reaction conditions as used in Example 8, the following compounds were prepared with the indicated starting material substituted for the diethylamine in Examples 10 and 11 and the 3-(6-benzonorbornanoxy)-1-chloro-2-propanol in Example 9. The resulting products are as indicated:

TABLE C

| Example | Starting material | Product |
|---|---|---|
| 9 | 3-(5-benzonorbornanoxy)-1-chloro-2-propanol | 1-diethylamina-3-(5-benzonorbornanoxy)-2-propanol. |
| 10 | Dimethylamine | 1-dimethylamina-3-(6-benzonorbornanoxy)-2-propanol. |
| 11 | Dibutylamine | 1-diebutylamina-3-(6-benzonorbornanoxy)-2-propanol. |

Example 12

3-(1,4-ethano - 1,2,3,4 - tetrahydro - 5 - naphthoxy)-1-chloro-2-propanol (5 g.) which was prepared according to Example 2 is dissolved in a solution of isopropylamine (15 ml.) and toluene (15 ml.) and heated overnight at 120° C.

The residue obtained after evaporation of the solvent and of the excess amine is dissolved in 30 ml. of ethyl acetate and treated with an equimolecular amount of citric acid in 20 ml. of ethyl acetate, producing the compound 1-isopropylamino-3-(1,4-ethano-1,2,3,4-tetrahydro-5-naphthoxy)-2-propanol citrate, M.P. 75–78° C.

Examples 13–14

Under conditions similar to those of Example 12, the following compounds were prepared with the indicated starting materials substituted for the isopropylamine; the resulting products are as indicated:

TABLE D

| Sample | Starting material | Product |
|---|---|---|
| 13 | Tert. butylamine | 1-tert.-butylamino-3-(1,4-ethano-1,2,3,4-tetrahydro-5-naphthoxy)-2-propanol. |
| 14 | Sec. butylamine | 1-sec.-butylamino-3-(1,4-ethano-1,2,3,4-tetrahydro-5-naphthoxy-2-propanol. |

Example 15

1 - (1,4 - ethano - 1,2,3,4 - tetrahydro-5-naphthoxy)-propyl-2,3-epoxide (39 g.) prepared as in Example 1 in 150 ml. of isopropylamine (150 ml.) is refluxed for 24 hours. The excess isopropylamine is evaporated under vacuum. The residue is then dissolved in diethyl ether and converted by means of gaseous HCl into the hydrochloride salt of 1-isopropylamino-3-(1,4-ethano-1,2,3,4-tetrahydro-5-naphthoxy)-2-propanol, melting point 130–132° C.

Examples 16–17

The following compounds were prepared by the process described in Example 15 with the indicated starting material substituted for the isopropylamine; the resulting products are as indicated:

TABLE E

| Example | Starting material | Product |
|---|---|---|
| 16 | Tert. butylamine | 1-tert-butylamino-3-(1,4-ethano-1,2,3,4-tetrahydro-5-naphthoxy)-2-propanol, M.P. 169–171° C. |
| 17 | Sec. butylamine | 1-sec.butylamino-3-(1,4-ethano-1,2,3,4-tetrahydro-5-naphthoxy)-2-propanol, M.P. 150–159° C. |

Example 18

1-(1,4-ethano - 1,2,3,4 - tetrahydro - 6 - naphthoxy)-propyl-2,3-epoxide (8.1 g.), prepared according to Example 1, in isopropylamine (50 ml.) is refluxed for 24 hours. After evaporation of the excess isopropylamine under vacuum the residue was found to contain 1-isopropylamino - 3 - (1,4 - ethano - 1,2,3,4 - tetrahydro-6-naphthoxy)-2-propanol, melting point=118–121° C.

Example 19

Sodium salt of 5-hydroxy - 1,4 - ethano-1,2,3,4-tetrahydronaphthalene (40 g.) in tetrahydrofuran (300 ml.) was added to a boiling solution of 1,3 dichloropropanon (25.5 g.) in tetrahydrofuran (150 ml.) in 1.5 hours. Then the solvent was evaporated and the residue, in ether, was washed with water. Concentration and crystallization from hexane afford 1(1,4-ethano - 1,2,3,4 - tetrahydro-5-naphthoxy)-3-chloro-propan-2-one (35 g.). Thirteen grs. of this product in tetrahydrofuran (150 ml.) was reacted with isopropylamine (8.5 ml.). After 24 hours the salt was filtered off and the solvent was evaporated. The residue was dissolved in 10% hydrochloric acid, extracted with ether and clarified with active charcoal. The solution was treated with excess NaHCO₃ and extracted with ether, then the Et₂O extract was dried. LiAlH₄ (5 g.) was added to the dry Et₂O solution and the mixture was heated under reflux for 6 hours. The excess of LiAlH₄ was decomposed with water and 20% sodium hydroxide and the organic material was isolated with ether.

Crystallization from cyclohexane affords 1-isopropylamino-3-(1,4 - ethano - 1,2,3,4 - tetrahydro-5-naphthoxy)propan-2-ol (8.5 g.), M.P. 102–103°.

Example 20

A nitrating mixture is prepared with conc. H₂SO₄ (13.6 ml.), H₂O (40 ml.) and NaNO₃ (15 g.) 5-hydroxybenzonorbornane (16 g.) is then added in small portions to the above cold solution at 10° C. After a night at 25°, the oil thus precipitated is decanted and washed twice with water, then distilled in a current of steam. The distillate contains the 6-nitro-5-hydroxy derivative of benzonorbornane which is filtered and crystallized from dilute ethanol, melting point 58–60° C.

On crystallization from cyclohexane, the residue gives 8-nitro-5-hydroxybenzonorbornane, melting point 114–115° C.

Examples 21–22

A nitrating mixture prepared with 99% HNO₃ (2.14 ml.) and acetic anhydirde (50 ml.), is cooled to 0° C. and 5-methoxy-1,4-ethano - 1,2,3,4 - tetrahydronaphthalene (8 g.) is added in small portions. After 1 hour, the mass is poured into water and the solid precipitate thus formed, which consists of a mixture of the 6- and 8-nitro derivatives, is filtered off.

In subsequnt separations, it was observed that on crystallization from isopropyl ether, 5-methoxy-8-nitro-1,4-ethano-1,2,3,4-tetrahydronaphthalene is obtained, melting point, 128–130° C., while crystallization from hexane gives 5-methoxy-6-nitro-1,4-ethano - 1,2,3,4 - tetrahydronaphthalene, melting point 73–74° C.

Examples 23–24

The following compounds were prepared from the products produced by Examples 21 and 22 by demethylation of the corresponding starting material with pyridine hydrochloride. 10 grams of the starting material was contacted with 30 grams of pyridine hydrochloride at 210–215° C. for 2 hours under reflux. The products are as indicated:

TABLE F

| Example | Starting material | Product |
|---|---|---|
| 23 | 5-methoxy-8-nitro-1,4-ethano-1,2,3,4-tetrahydronaphthalene | 5-hydroxy-8-nitro-1,4-ethano-1,2,3,4-tetrahydronaphthalene, M.P. 123–125° C. |
| 24 | 5-methoxy-6-nitro-1,4-ethano-1,2,3,4-tetrahydronaphthalene | 5-hydroxy-6-nitro-1,4-ethano-1,2,3,4-tetrahydronaphthalene, M.P. 79–80° C. |

Example 25

5 - hydroxy - 8 - nitro - 1,4 - ethanol - 1,2,3,4 - tetrahydronaphthalene (21.9 g.) is heated at 100° C. for 12 hours with epichlorhydrin (80 ml.) and piperidine (10 ml.). The mixture is concentrated to dryness and the residue suspended in water (200 ml.) containing NaOH (14.5 g.) and dioxane (10 ml.). The resulting suspension is stirred thoroughly for 24 hours at 25° C.

After dilution with an equal volume of water, the solid which has formed is filtered and crystallized from methanol, giving 1 - (8 - nitro - 1,4-ethano-1,2,3,4-tetrahydro-5-naphthoxy)propyl-2,3,-epoxide, melting point 107–108° C.

Examples 26–44

The following compounds were prepared by the process described in Example 25 with the indicated starting material substituted for the 5-hydroxy-8-nitro-1,4-ethano-1,2,3,4-tetrahydronaphthalene of Example 25; the resultant products are as follows and were liquids when indicated when asterisked.

TABLE H

| Example | Starting material | Product |
|---|---|---|
| 46 | Tert. butylamine | 1-tert butylamino-3(8-nitro-1,4-ethano-1,2,3,4-tetrahydro-5-naphthoxy)-2-propanol. |
| 47 | Sec. butylamine | 1-sec. butylamino-3(8-nitro-1,4-ethano-1,2,3,4-tetrahydro-5-naphthoxy)-2-propanol. |

Examples 48–50

The following compounds were prepared in the same manner as described in Example 45 with the indicated starting amines; however, the epoxide used was 1(6-nitro-1,4-ethano-1,2,3,4-tetrahydro-5-naphthoxy) - propyl - 2,3-epoxide, the nitro group being in the 6 rather than the 8 position; resulting products are as follows:

TABLE G

| Example | Starting material | Product |
|---|---|---|
| 26 | 6-nitro-1,4-ethano-1,2,3,4-tetrahydronapthalene | 1(6-nitro-1,4-ethano-1,2,3,4-tetrahydro-5-naphthoxy-propyl-2,3-epoxide, M.P. 60-62°C. |
| 27 | 7-nitro-1,4-ethano-1,2,3,4-tetrahydronapthalene | 1(7-nitro-1,4-ethano-1,2,3,4-tetrahydro-6-naphthoxy)-propyl-2,3-epoxide. |
| 28 | 8-nitrobenzonorbornane | 1(8-nitro-5-benzonorbornanoxy)-propyl-2,3-epoxide*. |
| 29 | 6-nitrobenzonorbornane | 1(6-nitro-5-benzonorbornanoxy)-propyl-2,3-epoxide*. |
| 30 | 8-acetamide-1,4-ethano-1,2,3,4-tetrahydronaphthalene | 1(8-acetamide-1,4-ethano-1,2,3,4-tetrahydro-5-naphthoxy)-propyl-2,3-epoxide. |
| 31 | 6-acetamide-1,4-ethano 1,2,3,4-tetrahydronaphthalene | 1(6-acetamide-1,4-ethano-1,2,3,4,-tetrahydro-5-naphthoxy)-propyl-2,3-epoxide. |
| 32 | 8-methanesulphonamide-1,4-ethano-1,2,3,4-tetrahydronaphthalene. | 1(8-methansulphonamide-1,4-ethano-1,2,3,4,-tetrahydro-5-naphthoxy)propyl-2,3-epoxide. |
| 33 | 8-acetamidebenzonorbornane | 1(8-acetamide-5-benzonorbornanoxy)-propyl-2,3-epoxide. |
| 34 | 6-acetamidebenzonorbornane | 1(6-acetamide-5-benzonorbornanoxy)-propyl-2,3-epoxide. |
| 35 | 8-methanesulphonamidebenzonorbornane | 1(8-methansulphonamide-5-benzonorbornanoxy)-propyl-2,3-epoxide. |
| 36 | 8-methylthio-1,4-ethano-1,2,3,4-tetrahydronaphthalene | 1-(8-methylthio-1,4-ethano-1,2,3,4-tetrahydro-5-napthoxy) propyl-2,3-epoxy. |
| 37 | 8-methylsulphoxide-1,4-ethano-1,2,3,4-tetrahydronaphthalene | 1-(8-methylsulphoxide-1,4-ethano-1,2,3-4 tetrahydro-5-naphthoxy)-propyl-2,3-epoxide. |
| 38 | 8-methanesulphone-1,4-ethano-1,2,3-4-tetrahydronapnthalene | 1-(8-methanesulphone-1,4-ethano-1,2,3,4-tetrahydro)-propyl-2,3-epoxide, M.P. 157-159° C. |
| 39 | 8-dimethylsulphonamide-1,4-ethano-1,2,3,4-tetrahydronaphthalene. | 1-(8-dimethylsulphonamide-1,4-ethano-1,2,3,4-tetrahydro-5-naphthoxy)-propyl-2,3-epoxide, M.P. 149-154° C. |
| 40 | 8-methoxy-1,4-amido-1,4-hydronaphthalene | 1-(8-methoxy-1,4-ethano-1,2,3,4-tetrahydro-5-naphthoxy) propyl-2,3-epoxy. |
| 41 | 8-chloro-1,4-amido-1,4-hydronaphthalene | 1-(8-chloro-1,4-ethano-1,2,3,4-tetrahydro-5-naphthoxy)propyl -2,3-epoxide. |
| 42 | 8-methyl-1,4-amido-1,4-hydronaphthalene | 1-(8-methyl-1,4-ethano-1,2,3,4-tetrahydro-5-naphthoxy )propyl-1,3-epoxide. |
| 43 | 2-chloro-8-methanesulphonamidobenzonorbornane | 1(2-chloro-8-methanesulphonamido-5-benzonorbornanoxy)-propyl-2,3-epoxy. |
| 44 | 3-chloro-8-methanesulphonamidobenzobornane | 1(3-chloro-8-methanesulphonamido-5-benzonorbornanoxy)-propyl-2,3-epoxy. |

Example 45

1 - (8 - nitro - 1,4-ethano - 1,2,3,4 - tetrahydro - 5-naphthoxy)-propyl-2,3-epoxide (5.5 g.) in isopropylamine (25 ml.), is refluxed for 24 hours. After evaporation of the excess amine, the residue is dissolved in 5% HCl (10 ml.), the insoluble matter is filtered off and the filtrate is made alkaline with 10% NH₄OH (6 ml.). The solid precipitate is collected on a filter, and crystallized from dilute ethanol. The resulting product is 1-isopropylamino-3-(8-nitro-1,4-ethano-1,2,3,4-tetrahydro-5-naphthoxy) - 2-propanol, melting point 85.6° C. The hydrochloride, prepared in the usual manner as described in Example 2, melts at 95° C.

Examples 46–47

The following compounds were prepared by the process described in Example 45 with the indicated starting material substituted for the isopropylamine; the resulting products are as indicated:

TABLE I

| Example | Starting material | Product |
|---|---|---|
| 48 | Isopropylamine | 1-isopropylamino-3(6-nitro-1,4-ethano-1,2,3,4-2-propanol.hydrochloride M.P. 159-161°C. |
| 49 | Tert. butylamine | 1-tert.-butylamino-3(6-nitro-1,4-ehtano-1,2,3,4-tetrahydro-5-naphthoxy)2-propanol. |
| 50 | Sec. butylamine | 1-sec.-butylamino-3-(6-nitro-1,4-ethano-1,2,3,4-tetrahydro-5-naphthoxy)2-propanol. |

Example 51

A mixture of 1-(6-nitro-5-benzonorbornanoxy)-propyl-2,3-epoxide (7.9 g.) and isopropylamine (50 ml.) are allowed to reflux for 6 hours at a temperature of 35° C.

After concentration of the reaction product, the residue is dissolved in boiling hexane (300 ml.). On cooling, isopropylamino-3(6 - nitro - 5 - benzonorbornanoxy)-2-propanol crystallizes; melting point 68–70° C.

Examples 52–56

The following compounds were prepared by the process as described in Example 51, with the indicated starting material substituted for the isopropylamine in Examples 52 and 53. In Examples 54–56 the starting epoxide was 1-(8-nitro - 5 - benzonorbornanoxy) - propyl-2,3-epoxide. The resulting compounds are as follows:

TABLE J

| Example | Starting material | Product |
|---|---|---|
| 52 | Tert. butylamine | 1-tert.-butylamino-3(6-nitro-5-benzonorbornanoxy)-2-propanol. |
| 53 | Sec. butylamine | 1-sec.-butylamino-3(6-nitro-5-benzonorbornanoxy)-2-propanol. |
| 54 | Isopropylamine | 1-isopropylamino-3(8-nitro-5-benzonorbornanoxy)-2-propanol, M.P. 85–88° C. |
| 55 | Tert butylamine | 1-tert.-butylamino-3(8-nitro-5-benzonorbornanoxy)-2-propanol. |
| 56 | Sec. butylamine | 1-sec.-butylamino-3(8-nitro-5-benzonorbornanoxy)-2-propanol. |

Example 57

1-isopropylamino - 3 - (8-nitro-1,2,3,4-tetrahydro-5-naphthoxy)-2-propanol (1.4 g.) dissolved in ethanol (50 ml.) containing 2 N HCl (5 ml.), was hydrogenated at atmospheric pressure in the presence of Pd (5%) (0.2 g.) on carbon. When absorption of the hydrogen is complete, the catalyst is filtered off, the liquid is evaporated to a small volume and then diluted with ether. The ether solution is allowed to stand and the dihydrochloride of 1-isopropylamino-3-(8-amino-1,4-ethano-1,2,3,4-tetrahydro-5-naphthoxy)-2-propanol crystallizes; melting point 265° C. (dec.).

Examples 58–64

The following compounds were prepared by the hydrogenation process as described in Example 57 with the indicated starting materials. The starting materials and products are as follows:

separated, washed with water and dried. On concentration and then dilution with petroleum ether, 1-isopropylamino-3(8 - acetamido-1,4-ethano-1,2,3,4-tetrahydro - 5 - naphthoxy)-2-propanol is obtained; melting point 157–159° C.

Examples 66–68

The following compounds were prepared in the same manner as Example 65 with the indicated starting materials substituted for the corresponding reactants. The products are as indicated:

TABLE L

| Example | Starting amine | Starting epoxide | Product |
|---|---|---|---|
| 66 | Tert. butylamine | 1-(8-acetamido-1,4-ethano-1,2,3,4-tetrahydro-5-naphthoxy)-2,3-epoxide | 1-tert. butylamino-3(8 - acetamido- 1,4 ethano-1,2,3,4-tetrahydro-5-naphthoxy)-2-propanol, M.P. 128–130° C. |
| 67 | Sec. butylamine | do | 1 - sec. butylamino - 3(8 - acetamido - 1,4 ethano - 1,2,3,4 - tetrahydro - 5 - naphthoxy - propanol, M.P. 124–127° C. |
| 68 | Isopropylamine | 1-(6-acetamido-1,4-ethano-1,2,3,4-tetrahydro-5-naphthoxy-)2-propanol | 1 - isopropylamino - 3(6 - acetamido - 1,4 - ethano - 1,2,3,4 - tetrahydro - 5 - naphthoxy -2- propanol, M.P. 118–120° C. |

Example 69

A solution of isopropylamino-3(8-amino - 1,4 - ethano-1,2,3,4-tetrahydro-5-naphthoxy)-2-propanol (3.04 g.) in alcohol-free CHCl$_3$ (15 ml.) is treated with methansulphonic anhydride (1.74 g.). The mixture is refluxed for 24 hours and then concentrated. The residue is crystalized from isopropanol and gives 1-isopropylamino-3(8-methansulphonamide-1,4-ethano - 1,2,3,4 - tetrahydro-5-naphthoxy)-2-propanol methanesulphonate, melting point 190–191° C.

TABLE K

| Example | Starting alcohol | Product |
|---|---|---|
| 58 | 1-isopropylamino-3(6-nitro-1,4-ethano-1,2,3,4-tetrahydro-5-naphthoxy)-2-propanol. | 1-isopropylamino-3(6-amino-1,4-ethano-1,2,3,4-tetrahydro-5-naphthoxy)-2-propanol. |
| 59 | 1-tert.butylamino-3(6-nitro-1,4,-ethano-1,2,3,4-tetrahydro-5-naphthoxy)-2-propanol. | 1-tert.-butylamino-3(6-amino-1,4-ethano-1,2,3,4-tetrahydro-5-naphthoxy)-2-propanol. |
| 60 | 1-tert.butylamino-3(8-nitro-1,4-ethano-1,2,3,4-tetrahydro-5-naphthoxy)-2-propanol. | 1-tert.-butylamino-3(8-amino-1,4-ethano-1,2,3,4-tetrahydro-5-naphthoxy)-2-propanol. |
| 61 | 1-sec.butylamino-3(8-nitro-1,4-ethano-1,2,3,4-tetrahydro-5-naphthoxy)-2-propanol. | 1-sec.-butylamino-3(8-amino-1,4-ethano-1,2,3,4-tetrahydro-5-naphthoxy)-2-propanol. |
| 62 | 1-sec.butylamino-3(6-nitro-1,4-ethano-1,2,3,4-tetrahydro)-5-naphthoxy-2-propanol. | 1-sec.-butylamino-3(6-amino-1,4-ethano-1,2,3,4-tetrahydro-5-naphthoxy)-2-propanol. |
| 63 | 1-isopropylamino-3(8-nitro-5-benzonorbornanoxy)-2-propanol | 1-isopropylamino-3(8-amino-5-benzonorbornanoxy)-2-propanol. |
| 64 | 1-isopropylamino-3(6-nitro-5-benzonorbornanoxy)-2-propanol | 1-isopropylamino-3(6-amino-5-benzonorbornanoxy)-2-propanol. |

Example 65

1(8-acetamido-1,4-ethano-1,2,3,4-tetrahydro - 5 - naphthoxy)-2,3-epoxide (4.6 g.) is dissolved in a mixture of toluene (30 ml.) and isopropylamine (15 ml.), and heated in a closed tube at 120° C. for 15 hours. After eliminating the excess reagent and the solvents under vacuum, the residue is partitioned between diethyl ether and a solution of NH$_4$OH (1%). The organic layer is

Examples 70–74

The following compounds are prepared as described in Example 69 with the indicated starting materials; the resulting products are as indicated:

TABLE M

| Example | Alkyl sulphonic acid | Starting alcohol | Product |
|---|---|---|---|
| 70 | Methanesulphonic acid | 1-tert.butylamino-3(8-amino-1,4-ethano-1,2,3,4-tetrahydro-5-naphthoxy-2-propanol. | 1-tert. butylamino-3(8-methanesulphonamido-1,4-ethano-1,2,34,-tetrahydro-5-napthoxy)-2-propanol. |
| 71 | do | 1-tert.-butylamino-3(8-amino-5-benzonorbornanoxy)-2-propanol. | 1-isopropylamino-3(8-methanesulphonamido-5-benzonorbornanoxy)-2-propanol. |
| 72 | do | do | 1-tert.-butylamino-3(8-methanesulphonamido-5-benzonorbornanoxy)-2-propanol. |
| 73 | Ethanesulphonic acid | 1-isopropylamino-3-(8-amino-1,4-ethano-1,2,3,4-tetrahydro-5-naphthoxy)-2-propanol. | 1-isopropylamino-3(8-ethanesulphonamido-1,4-ethano-1,2,3,4-tetrahydro--5-naphthoxy)2-propanol. |
| 74 | Isopropanesulphonic acid | do | 1-isopropylamino-3(8-isopropansulphonamido-1,4-ethano-1,2,3,4-tetrahydro-5-naphthoxy)-2-propanol. |

Example 75

1(8 - methanesulphonamido - 5 - benzonorbornanoxy)-propyl-2,3-epoxide (6.2 g.) in isopropylamine (60 ml.) is refluxed for 8 hours and then concentrated to dryness. The residue is then dissolved in 25 ml. of water. After bringing the pH to about 7.7 with 1% HCl (4 ml.), the liquid is extracted with four 75 ml. portions of methylene chloride. After evaporation of solvent the residue is crystallized from an equimolar mixture of ethyl acetate: diethyl ether, thereby giving 1-isopropylamino-3(8-methanesulphonamide-5-benzonorbornanoxy) - 2 - propanol, melting point 140–142° C.

Examples 76–78

The following compounds were prepared as described in Example 75 with the indicated starting materials; the products are as indicated:

Example 88

1(3-chloro-8-acetamido-5-benzonorbornanoxy)-propyl-2,3-epoxide (1.3 g.) is heated with isopropylamine (5 ml.) in a closed tube, at 80° C. for a period of 18 hours. After concentration, the residue thus formed is separated between 1% NH$_4$OH (25 ml.) and diethyl ether (25 ml.). The organic layer is dried and treated with a current of gaseous HCl for about 5 minutes to form the hydrochloride salt.

1-isopropylamino-3(3-chloro-8-acetamido-5-benzonorbornanoxy) - 2-propanol hydrochloride thus obtained is crystallized from a mixture of ethanol and diethyl ether.

TABLE N

| Example | Alkyl sulphonic acid | Starting alcohol | Product |
|---|---|---|---|
| 76 | Tert.butylamine | 1(8-methanesulphonamido-5-benzonorbornanoxy)-2-propanol. | 1-tert.-butylamino-3(8-methanesulphonamido-5-benzonorbornanoxy)-2-propanol. |
| 77 | Isopropylamine | 1(8-methanesulphonomido-1,4-ethano-1,2,3,4-tetrahydro-5-naphthoxy)-2-propanol | 1-isopropylamino-3(8-methanesulphonamido-1,4-ethano-1,2,3,4-tetrahydro-5-naphthoxy)-2-propanol. |
| 78 | Tert.butylamine | do | 1-tert.-butylamino-3(8-methanesulphonamido-1,4-ethano-1,2,3,4-tetrahydro-naphthoxy)-2-propanol. |

Example 79

A solution of 1-isopropylamino-3(8-amino-5-benzonorbornanoxy)-2-propanol (2.88 g.) in anhydrous benzene (50 ml.), is treated with acetic anhydride (1.1 ml.). The mixture is then refluxed for 2 hours and next evaporated to dryness. The residue is treated with 1% NH$_4$OH (25

Examples 89–91

The following are prepared in a manner similar to Example 88 with the indicated starting material substituted for the 1(3 - chloro-8-acetamido-5-benzonorbornanoxy)-propyl-2,3-epoxide of Example 88. The products are as follows:

TABLE Q

| Example | Starting material | Product |
|---|---|---|
| 89 | 1(2-chloro-8-acetamido-5-benzonorbornanoxy)-propyl-2,3-epoxide | 1-isopropylamino-3(2-chloro-8-acetamido-5-benzonorbornanoxy)-2-propanol. |
| 90 | 1(3-chloro-8-methanesulphonamido-5-benzonorbornanoxy)-2-propanol | 1-isopropylamino-3(3-chloro-8-methanesulphonamido-5-benzonorbornanoxy)-2-propanol. |
| 91 | 1(2-chloro-8-methanesulphonamido-5-benzonorbornanoxy)-2-propanol | 1-isopropylamino-3-(2-chloro-8-methanesulphonamido-5-benzonorbornanoxy)-2-propanol. | ml.) and ethyl acetate (25 ml.). After washing with water, the organic layer is dried and concentrated. The residue after crystallization from cyclohexane gives 1-isopropylamino - 3(8 - acetamido-5-benzonorbornanoxy)-2-propanol, melting point, 149–151° C.

Examples 80–87

The following are prepared in a similar manner as the process of Example 79 with the indicated starting materials. The products are as follows:

Example 92

1(8 - methylsulphone - 1,4-ethano-1,2,3,4-tetrahydro-5-naphthoxy)-propyl - 2,3-epoxide (5 g.) (obtained as described in Example 1 having a melting point of 157–159° C.) is dissolved in isopropylamino (25 ml.) and refluxed for 12 hours. On concentrating, 1-isopropylamino-3-(8-methylsulphone - 1,4-ethano-1,2,3,4-tetrahydro-5-naphthoxy)-2-propanol, melting point 120–122° C., is obtained.

TABLE O

| Example | Starting material | Product |
|---|---|---|
| 80 | 1-tert.butylamino-3(8-amino-5-benzonorbornoxy)-2-propanol | 1-tert.-butylamino-3(8-acetamido-5-benzonorbornoxy)-2-propanol. |
| 81 | 1-sec.butylamino-3(8-amino-5-benzonorbornoxy)-2-propanol | 1-sec.-butylamino-3(8-acetamido-5-benzonorbornanoxy)-2-propanol. |
| 82 | 1-isopropylamino-3(6-amino-5-benzonorboranoxy)-2-propanol | 1-isopropylamino-3(6-acetamido-5-benzonorbornanoxy)-2-propanol. |

TABLE P

| Example | Starting material | Anhydride | Product |
|---|---|---|---|
| 83 | 1-isopropylamino-3(8-amino-5-benzonorbornanoxy)-2-propanol. | Propionic anhydride | 1-isopropylamino-3(8-propionamido-5-benzonorbornanoxy)-2-propanol. |
| 84 | 1-isopropylamino-3(8-amino-5-benzonorbornanoxy)-2-propanol. | Butyric anhydride | 1-isopropylamino-3(8-butyramido-5-benzonorbornanoxy)-2-propanol. |
| 85 | 1-isopropylamino-3(8-amino-1,4-ethano-1,2,3,4-tetrahydro-5-naphthoxy-2-propanol. | Acetic anhydride | 1-isopropylamino-3(8-acetamido-1,4-ethano-1,2,3,4-tetrahydro-5-naphthoxy)-2-propanol. |
| 86 | do | Propionic anhydride | 1-isopropylamino-3(8-propionamido-1,4-ethano-1,2,3,4-tetrahydro-5-naphthoxy)-2-propanol. |
| 87 | 1-isopropylamino-3(6-amino-1,4-ethano-1,2,3,4-tetrahydro-5-naphthoxy)-2-propanol. | Acetic anhydride | 1-isopropylamino-3(6-acetamido-1,4-ethano-1,2,3,4-tetrahydro-5-naphthoxy)-2-propanol. |

Examples 93–95

The following compounds were prepared in the same manner as Example 92 with the respective starting materials. The products are as indicated:

TABLE R

| Example | Amine | Starting epoxide | Product |
|---|---|---|---|
| 93 | Tert. butylamine | 1(8-methylsulphone-1,4-ethano-1,2,3,4-tetrahydro-5-naphthoxy-2,3-epoxide. | 1-tert.-butylamino-3(8-methylsulphone-1,4-ethano-1,2,3,4-tetrahydro-5-naphthoxy)-2-propanol, M.P. 133–134° C. |
| 94 | Isopropylamine | 1(8-methylsulphoxido-1,4-ethano-1,2,3,4-tetrohydro-5-naphthoxy-2,3-epoxide. | 1-isopropylamino-3-(8-methylsulphoxide-1,4-ethano-1,2,3,4-tetrahydro-5-naphthoxy)-2-propanol. |
| 95 | do | 1(8-methylthio-1,4-ethano-1,2,3,4-tetrahydro-5-naphthoxy)-2,3-epoxide. | 1-isopropylamino-3-(8-methylthio-1,4-ethano-1,2,3,4-tetrahydro-5-naphthoxy)-2-propanol, M.P. 63–64° C. |

Example 96

1-isopropylamino - 3(8-amino - 1,4 - ethano - 1,2,3,4-tetrahydro - 5 - naphthoxy) - 2 - propanol (2 g.) dissolved in ethanol (25 ml.) is treated with formaldehyde (0.5 ml. 38%) and 5% Pd (0.2 g.) on carbon. Hydrogenation is then allowed to proceed under a pressure of 3 atm. in Parr's apparatus. In about 4 hours, when absorption of the hydrogen is complete, the catalyst is filtered off, the resulting filtrate is evaporated to dryness and the residue is treated with ethereal HCl giving 1-isopropylamino - 3(8-methylamino - 1,4 - ethano-1,2,3,4-tetrahydro - 5 - naphthoxy)-2-propanol dihydrochloride.

Examples 97–101

The following compounds were prepared in the same manner as Example 96 with the respective starting materials as indicated. The products are as follows:

TABLE S

| Example | Starting material | Product |
|---|---|---|
| 97 | 1-isopropylamino-3(6-amino-1,4-ethano-1,2,3,4-tetrahydro-5-naphthoxy)-2-propanol. | 1-isopropylamino-3(6-methylamine-1,4-ethano-1,2,3,4-tetrahydro-5-naphthoxy)-2-propanol. |
| 98 | 1-tert.butylamino-3(8-amino-1,4-ethano-1,2,3,4-tetrahydro-5-naphthoxy)-2-propanol. | 1-tert.-butylamino-3(8-methylamine-4,4-ethano-1,2,3,4-tetrahydro-5-naphthoxy)-2-propanol. |
| 99 | 1-sec.butylamino-3(8-amino-1,4-ethano-1,2,3,4-tetrahydro-5-naphthoxy)-2-propanol. | 1-sec.-butylamino-3(8-methylamine-1,4-ethano-1,2,3,4-tetrahydro-5-naphthoxy)-2-propanol. |
| 100 | 1-isopropylamino-3(8-amino-5-benzobornanoxy)-2-propanol. | 1-isopropylamine-3(8-methylamino-5-benzonorbornanoxy)-2-propanol. |
| 101 | 1-isopropylamino-3(6-amino-5-benzonorbornanoxy)-2-propanol. | 1-isopropylamine-3(6-methylamino-5-benzonorbornanoxy)-2-propanol. |

Example 102

5-hydroxy - 8 - methoxy - 1,4 - ethano - 1,2,3,4 - tetrahydro-naphthalene (4.1 g.) dissolved in epichlorhydrin (20 ml.) and piperidine (0.5 ml.) are heated at 100° C. for 10 hours. The excess epichlohydrin is evaporated and the residue dissolved in diethyl ether and washed with water. On concentrating the ether, 1-chloro-3(8-methoxy-1,4 - ethano - 1,2,3,4 - tetrahydro - 5 - naphthoxy) - 2-propanol is obtained in the crude state. It is dissolved in toluene (30 ml.) containing isopropylamine (15 ml.) and heated in a closed tube at 120° C. for 24 hours. After the usual processing consisting of the additional steps of Example 8, 1-isopropylamine-3(8-methoxy - 1,4 - ethano-1,2,3,4 - tetrahydro - 5 - naphthoxy) - 2 - propanol is obtained and crystallized from ligroin.

Examples 103–105

The following compounds were prepared according to the process of Example 102 with the respective starting materials substituted for the 5-hydroxy-8-methoxy-1,4-ethano - 1,2,3,4 - tetrahydronaphthalene. The products are as follows:

TABLE T

| Example | Starting material | Product |
|---|---|---|
| 103 | 5-hydroxy-6-methoxy-1,4-ethano-1,2,3,4-tetrahydro-naphthalene | 1-isopropylamino-3(6-methoxy-1,4-ethano-1,2,3,4-tetrahydro-5-naphthoxy)-2-propanol. |
| 104 | 5-hydroxy-8-methoxy-5-benzonorbornane | 1-isopropylamino-3(8-methoxy-5-benzonorbornanoxy)-2-propanol. |
| 105 | 5-hydroxy-6-methoxy-5-benzonorbornane | 1-isopropylamino-3(6-methoxy-5-benzonorbornanoxy)-2-propanol. |

Example 106

1(8-chloro - 1,4 - ethano - 1,2,3,4 - tetrahydo-5-naphthoxy)-propyl-2,3-epoxide (9 g.) and isopropylamine (40 ml.) are refluxed together for 15 hours. After evaporating off the excess amine, the residue is treated with gaseous HCl in diethyl ether for 5 minutes and transformed into 1-isopropylamino - 3(8-chloro - 1,4 - ethano-1,2,3,4-tetrahydro - 5 - naphthoxy)-2-propanol hydrochloride, melting point 144–146° C.

Examples 107–109

The following compounds were prepared as described in the process of Example 106 from the starting materials. The results are as follows:

TABLE U

| Example | Starting time | Starting epoxide | Product |
|---|---|---|---|
| 107 | Tert. butylamine | 1(8-chloro-1,4-ethano-1,2,3,4-tetrahydro-5-naphthxoy)-propyl-2,3-epoxide. | 1-tert.-butyl-3-(8-chloro-1,4-ethano-1,2,3,4-tetrahydro-5-naphthoxy)-2-propanol. |
| 108 | Isopropylamine | 1(8-fluoro-1,4-ethano-1,2,3,4-tetrahydro-5-naphthoxy)-propyl-2,3-epoxide. | 1-isopropylamino-3-(8-fluoro-1,4-ethano-1,2,3,4-tetrahydro-5-naphthoxy)-2-propanol. |
| 109 | do | 1(8-bromo-1,4-ethano-1,2,3,4-tetrahydro-5-naphthoxy)-propyl-2,3-epoxide. | 1-isopropylamino-3-(8-bromo-1,4-ethano-1,2,3,4-tetrahydro-5-naphthoxy)-2-propanol. |

Example 110

5 - hydroxy-8-dimethyl-sulphonamido-1,4-ethano-1,2,3,4-tetrahydro-naphthalene (14 g.), melting point 182–184° C., is reacted with epichlorohydrin (70 ml.) and a small quantity of piperidine (0.5 ml.) and heated at 100° C. for 17 hours to form 1(8-dimethyl-sulphonamido-1,4-ethano-1,2,3,4-tetrahydro-5-naphthoxy)-propyl-2,3-epoxide in the same manner as in Example 1, M.P. 149–154° C.

The crude epoxide thus produced is refluxed with isopropylamine (50 ml.) for 12 hours and thus transformed into the product 1-isopropylamino-3(8-dimethyl-sulphonamide-1,4-ethano-1,2,3,4 - tetrahydro - 5 - naphthoxy)-2-propanol, M.P. 100–103° C.

Example 111

5-hydroxy - 1,4 - ethano-1,2,3,4-tetrahydro-naphthalene (5.3 g.) dissolved in dimethylformamide (50 ml.) is treated with NaOCH$_3$ (4.9 g.). The mixture is heated at 50° C. for an hour and then 1-tert.-butylamino-3-chloro-2-propanol hydrochloride (6.1 g.) is added to the hot solution, which is then kept at 120–125° C. for 5 hours. After eliminating the dimethylformamide under vacuum, the residue is partitioned between 5% HCl (50 ml.) and diethyl ether (50 ml.). The aqueous phase is then made alkaline with 10% NaOH (30 ml.) and extracted with additional 75 ml. portions of diethyl ether. The ethereal layer is dried over Na$_2$SO$_4$ and treated with a current of gaseous HCl for a period of 5 minutes. The precipitated solid is filtered and crystallized from an equimolar mixture of isopropanol: petroleum ether, giving 1-tert.-butylamino-3-(1,4 - ethano-1,2,3,4-tetrahydro-5-naphthoxy)-2-propanol, melting point 167–169° C.

What is claimed is:
1. Compound of the formula:

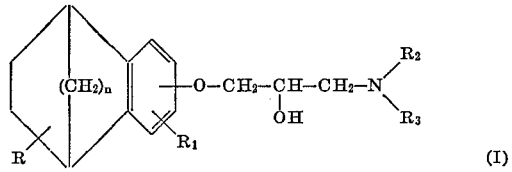

where R and R$_1$ are independently selected from the group consisting of:
(a) hydrogen,
(b) halogen,
(c) lower alkyl of 1 to 4 carbon atoms,
(d) lower alkoxy of 1 to 4 carbon atoms,
(e) nitro,
(f) an amino group of the general formula:

where R' and R'' are independently selected from the group consisting of hydrogen and lower alkyl of 1 to 4 carbon atoms;

(g) —S—R''', where R''' is an alkyl group of 1 to 6 carbons, and
(h) —SO—R''', where R''' is defined as above, $n$ is 1 or 2, R$_2$ is selected from the group consisting of hydrogen, lower alkyl of 1 to 4 carbons and a benzyl group, R$_3$ is selected from the group consisting of hydrogen, alkyl of 1 to 10 carbons and a benzyl group, and the pharmaceutically-acceptable salts of said compound.

2. The compound as claimed in claim 1 wherein at least one or R$_2$ and R$_3$ is an alkyl of 1 to 10 carbons.

3. The compound as claimed in claim 1 wherein R and R$_1$ are lower alkyl selected from methyl, ethyl, n-propyl, isopropyl, n-butyl, sec-butyl and tert-butyl.

4. The compound as claimed in claim 2 wherein said alkyl is methyl, ethyl, n-propyl, isopropyl, n-butyl, sec-butyl and tert-butyl.

5. The compound as claimed in claim 1 wherein R$_2$ is lower alkyl of 1 ot 4 carbons and R$_3$ is alkyl of 1 to 10 carbons.

6. The compound as claimed in claim 1 wherein said compound is 1-isopropylamino-3-(1,4-ethano-1,2,3,4-tetrahydro-5-naphthoxy)-2-propanol.

7. The compound as claimed in claim 1 wherein said compound is 1-isopropylamino-3-(1,4-ethano-1,2,3,4-tetrahydrohydro-8-nitro-5-naphthoxy)-2-propanol.

8. The compound as claimed in claim 1 wherein said compound is 1-isopropylamino-3-(5-benzonorbornanoxy)-2-propanol.

References Cited
UNITED STATES PATENTS 3,415,873  12/1968  Stevens _____ 260—501.18

ROBERT V. HINES, Primary Examiner

U.S. Cl. X.R.

260—343.7, 348 A R, 501.18, 501.19, 556 AR B, 562 A, 590, 607 A, 609 R, 612 D, 622 R, 623 R; 424—321, 324, 330